Jan. 26, 1965 G. ZOLLMER 3,166,930
ULTRASONIC TESTING
Filed Jan. 23, 1961 2 Sheets-Sheet 1
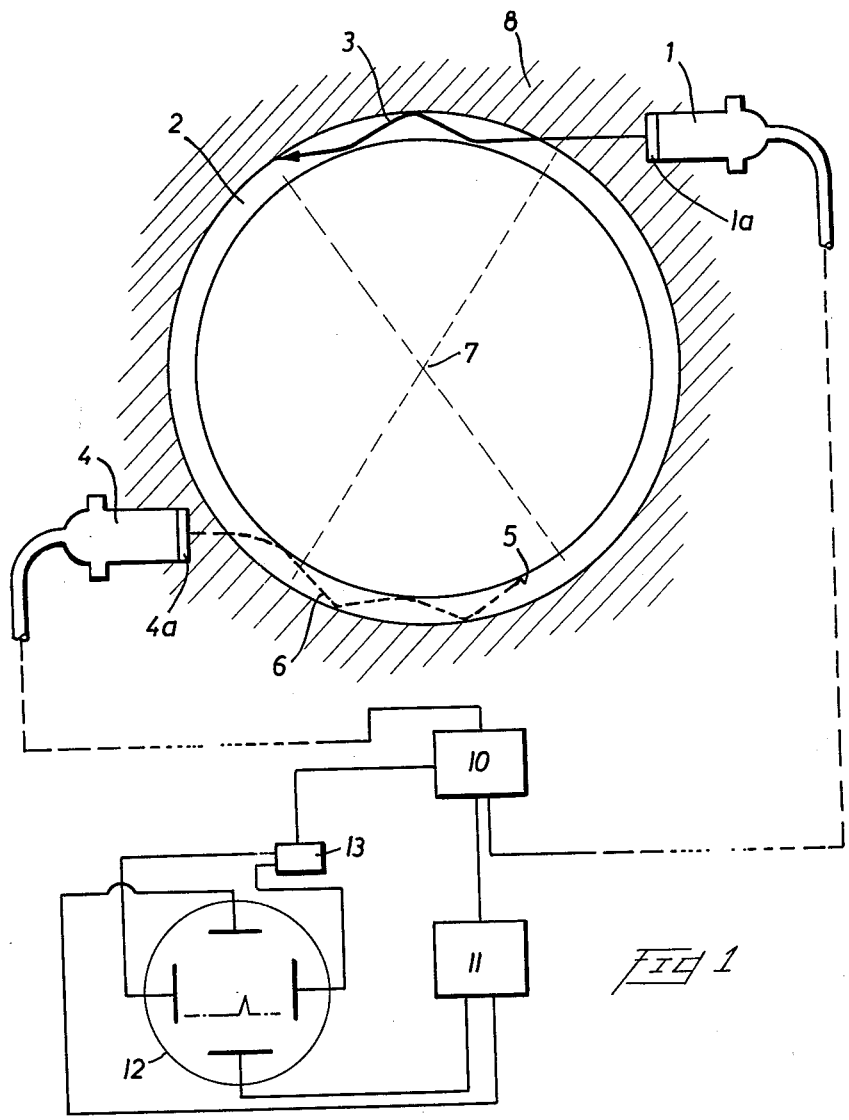
INVENTOR
Gunther Zollmer
BY
Watson, Cole, Grindle & Watson
Attys.

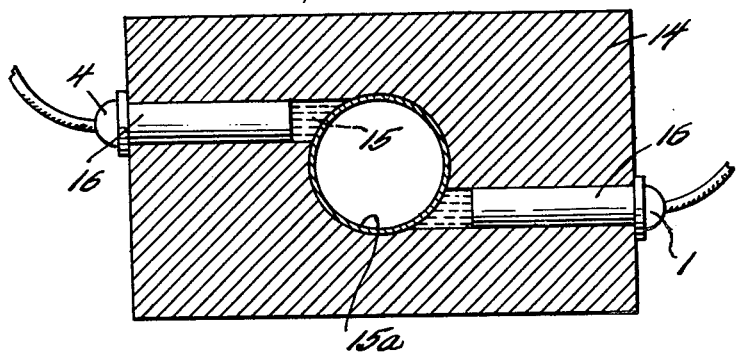
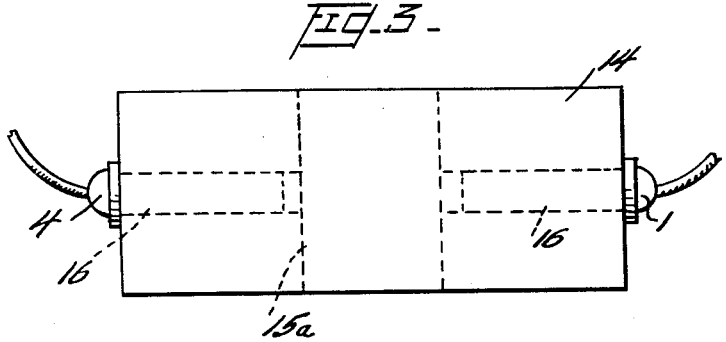

3,166,930
ULTRASONIC TESTING
Gunther Zollmer, Saalfelderstrasse 6,
Cologne-Hohenberg, Germany
Filed Jan. 23, 1961, Ser. No. 83,963
Claims priority, application Germany, Jan. 23, 1960,
K 39,753
3 Claims. (Cl. 73—67.7)

This invention relates to apparatus for testing tubes and round stock and the like for faults by measurement of the time interval between an ultrasonic pulse and its echo, using separate transmitting and receiving probes.

In ultrasonic testing use is made either of a single electro-mechanical transducer for transmitting and receiving or separate transducers. The pulse is injected normally or at any desired angle into the surface of the test piece. The latter is utilized in discovering lengthwise fissures in tubes or in the surface layers of round solid stock; the ultrasonic pulse preferably running in a zigzag or polygonal path around the test piece.

Probes for this purpose are constructed either to stand or be placed in contact with the test piece with a coupling fluid in between, or to be used submerged with the test piece in a bath of liquid. In the direct method disturbing echoes arise in the wedge needed for injection at an angle and last so long that in a test piece of fairly small diameter the primary pulse has gone once around the test piece and is recorded before the disturbing echoes have become too weak. It is then not possible to accurately distinguish between echoes from a fault and these disturbing echoes.

In the submerged technique a diaphragm limited beam is so directed upon the curved surface of the test piece that the wave reflected from the surface passes beside the probe and so no disturbing echoes arise. But the technique has the serious disadvantage that the lengthwise surface faults give a stronger indication than do faults deeper in the test piece. It is true that an idea has been proposed using separate transmitting and receiving probes arranged side by side in the lengthwise direction; but then the probes must be mutually inclined. Surface and deep faults are shown with the same sensitivity but only at one point of the periphery where the beams from the two probes cross, later running in spiral paths. It is obvious that for complete surface testing every point of the surface must be brought to the test position. This is a very complex matter and calls for difficult adjustment of the apparatus.

To avoid the disadvantages above-mentioned the present invention proposes so to arrange the probes that a substantial strip of the periphery is surveyed at one time. It is therefore an object of the invention to provide separate transmitting and receiving probes arranged in a plane at right angles to the longitudinal axis of the test piece and spaced apart, preferably by 180°, so that the primary injected ultrasonic wave, running in one peripheral direction only, is substantially undetectable by the acoustically active surface of the receiving probe. A further object resides in setting the acoustically active surface of transmission at a slant to the surface of the test piece, such as a round pipe to make the receiving probe rotatable around the periphery of the tube or the like and to have the active surface face of the receiver face oppositely to that of the transmitter but directed at a slant to the surface of the test piece to face in the same direction about the piece that the signals are propagated from the transmitting probe. In a preferred construction a block of metal or synthetic resin is provided in which there is a lengthwise bore to receive the test piece and two bores or the like at a slant or substantially at right angles to it for the transmitting and receiving probes, any free space in the bores being filled with a coupling liquid.

The method of adjusting the relative positions of the probes is as follows: as the transmitter probe is transmitting the receiving probe is first placed adjacent the working position of the transmitting probe and then facing with a similar slant to the surface is rotated continuously about the circumference of the test piece in the peripheral direction of travel of the primary pulse transmitted about the circumference of the test piece while the indications of received pulses are being watched. The working position is found for the receiving probe at a position substantially 180° from the transmitting probe, where the receiving probe faces oppositely to the transmitting probe and along the direction of propagation of the wave directly transmitted from the transmitting probe to thereby give at the receiving probe only a minimized negligible indication of the transmitted wave. The probes may thereafter be fixed in a mounting block.

The invention is further explained with reference to the accompanying drawing showing in FIG. 1 a cross section of a diagrammatic apparatus, FIGURE 2 being a cross section view of apparatus embodying the invention, and FIGURE 3 being a plan view of the apparatus shown in FIGURE 2.

It is assumed by way of example that the submerged technique is used. The transmitting probe 1 having an acoustically active surface 1a, for example a quartz crystal, and the receiving probe 4 with its acoustically active surface 4a are arranged around a tube 2 which is the test piece. The invention is equally applicable to round or solid stock, particularly to determine the existence of surface faults. The hatching 8 around the test piece indicates the coupling liquid. The probes 1 and 4 are in the plane of the drawing which is at right angles to the axis of the tube. The transmitting probe is so arranged relatively to the surface of the test piece that the beam enters the test piece at an angle and travels in one direction only. The receiving probe 4 is, for example, at the same slant as the transmissting probe but is spaced from it preferably by 180°. The primary pulse is indicated by 3.

The injected pulse 3 runs in zigzag fashion around the surface of the test piece. When it traverses a part of the test piece near the receiving probe 4 it cannot enter the acoustically active surface 4a. But when it strikes a fault 5 a secondary beam 6 is reflected back which in its turn runs in a zigzag path around the tube but in the opposite direction to the beam 3. It is apparent that due to its slant the receiving probe 4 is well placed to receive the secondary pulse, and to exhibit it so indicating the position of the fault. It is not material from what point in the periphery the secondary pulse starts. In any case after a longer or shorter course in the surface of the test piece the pulse and therefore the fault are shown by the receiving probe without fail.

The arrangement of probes according to the invention has the advantage that both surface and deep faults are indicated with the same sensitivity. It is important that the device permits the periphery to be tested strip by strip and that setting up the apparatus is comparatively simple.

All that is needed to set the receiving probe is to displace it from the transmitting probe so that it does not receive waves radiated from the latter as hereinbefore described.

A simple and inexpensive mounting for the probes shown in FIGURES 2 and 3 is built as a base which can be moved along the test piece 15a, having on each side next the test piece a guide bore receiving a portion 16 therein of a probe 4. The base 14 including the transmitting and receiving probes is movable longitudinally along the test piece and may be rotated with the two probe paths, FIG. 2, being parallel. The probes 1 and 4 can thus be set at the same radius and parallel to each other but 180° apart. When a series of test pieces have the same diameter, a bored base 14 is employed consisting of a metal or plastic block 14. In this block 14 there is first a longitudinal bore which takes the test piece. Substantially at right angles to this bore are two recesses or bores receiving the portions 16 of probes and spaced apart around the periphery. Even coupling is obtained by filling with coupling liquid any space 15 in the block left unoccupied by the workpiece 15a and probes.

An ultrasonic generator and probe coupling unit 10 is provided for processing pulses and communicating with the transmitting and the receiving probes. This unit will be connected to the probes 1, 4 by wiring means, FIG. 1. Echo pulses, received from a defect 5 will be supplied through amplifier 11 to the deflecting plates of a cathode ray tube 12. Other deflecting plates of this tube will be connected to a time base generator 13 and this generator 13 will be connected to the transducer unit as shown. The broken lines 7 of FIG. 1 indicate electrical connecting cables between the generator 10 and the probe heads.

As a coupling liquid water, oils or any other suitable liquid may be used.

What I claim is:

1. A method of ultrasonic testing of tubes and other hollow stock in which waves may be propagated about the circumference by reflection between inner and outer stock surfaces, which consists in mounting on the stock a piezoelectric transmitting probe, directing it to radiate into the stock in a plane substantially at right angles to the axis of the stock and at an inclination to the surface of the stock, mounting a receiving probe upon the stock adjacent to the transmitting probe in the plane of its radiation, directing it to receive radiation from a direction opposite to the direction of the transmitted radiation and at an inclination to the surface of the stock similar to the inclination of the transmitted radiation, rotating said receiving probe around the axis of the stock in the plane of the transmitted radiation until reception is a minimum and the active face of the receiver probe is faced oppositely to that of the transmitter probe but in the direction of propagation of the waves in the test piece walls, and thereafter moving said transmitting and receiving probes together along and around the stock to detect deflections from faults.

2. Apparatus for testing longitudinally extending tubes and like test pieces for faults by measurement of the time interval between an ultrasonic pulse and its echo, comprising separate transmitting and receiving probes each having ultrasonic transducer means, said probes spaced adjacent the periphery of the test piece in a plane substantially at right angles to the longitudinal axis of the test piece and at an angle with respect to the surface of the test piece, said transmitting probe being faced at a slant to the surface of the test piece to propagate ultrasonic pulses about the circumference of the test piece, and said receiving probe being faced at a similar slant to the surface of the test piece substantially 180° about the circumference from the transmitting probe to extend in the direction of propagation of the pulses thereby to minimize pickup of transmitted pulses and receive echos reflected by defects in the test piece.

3. Apparatus according to claim 2 comprising a block of solid material with a longitudinal bore therein for receiving a longitudinal test piece with a round circumference in the longitudinal bore for relative rotation and longitudinal movement therein, the block comprising also bores at right angles to said longitudinal bore, the bores containing the probes, the space between the probes and the test piece being filled with a coupling liquid.

References Cited in the file of this patent

UNITED STATES PATENTS

| | | |
|---|---|---|
| 2,795,133 | Ots | June 11, 1957 |
| 2,940,305 | Williams et al. | June 14, 1960 |
| 2,946,217 | Fruengel | July 26, 1960 |

FOREIGN PATENTS

| | | |
|---|---|---|
| 716,687 | Great Britain | Oct. 13, 1954 |